Feb. 17, 1931.      J. H. JACOBS      1,793,321
WIND POWER MOTOR
Filed July 15, 1929      2 Sheets-Sheet 1
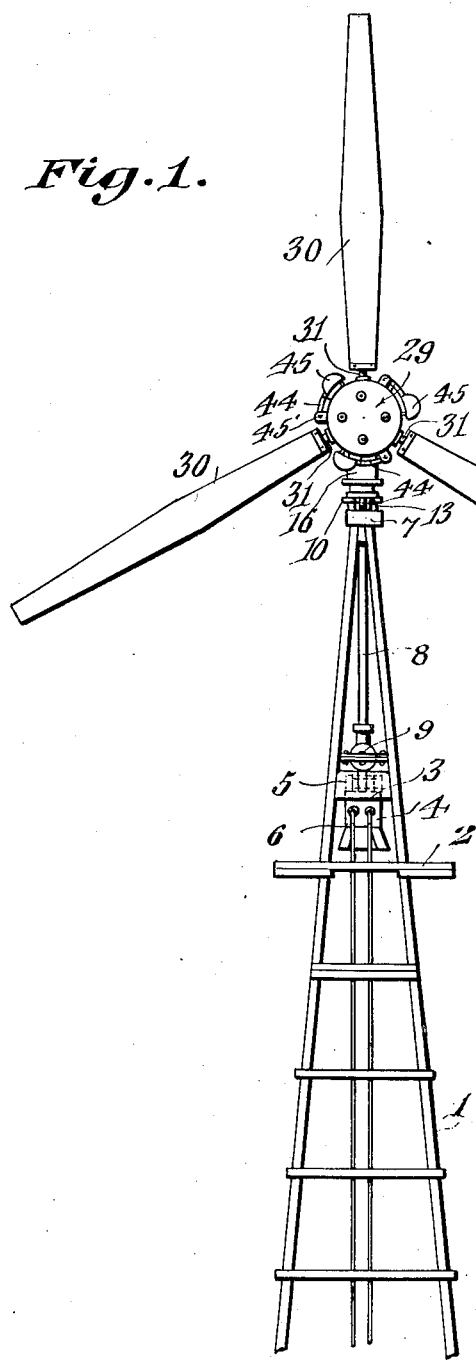
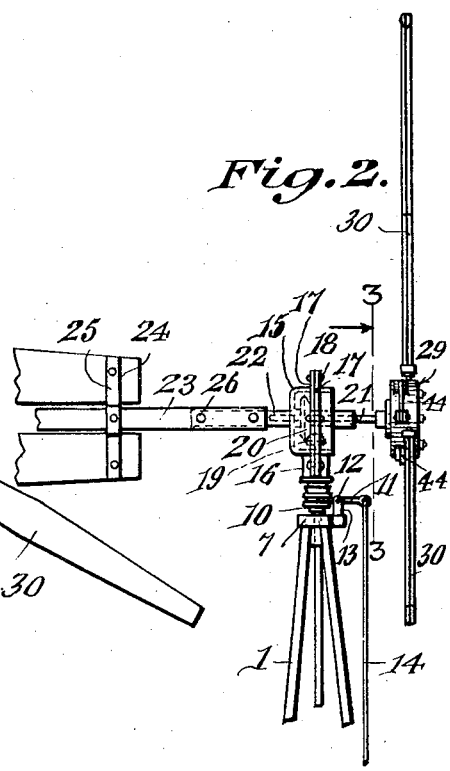
INVENTOR.
Joseph H. Jacobs,
BY
Geo. P. Kimmel.
ATTORNEY.

Feb. 17, 1931.    J. H. JACOBS    1,793,321
WIND POWER MOTOR
Filed July 15, 1929    2 Sheets-Sheet 2

INVENTOR.
Joseph H. Jacobs,
BY
Geo. P. Kimmel.
ATTORNEY.

Patented Feb. 17, 1931

1,793,321

UNITED STATES PATENT OFFICE

JOSEPH H. JACOBS, OF RICHEY, MONTANA

WIND-POWER MOTOR

Application filed July 15, 1929. Serial No. 378,495.

This invention relates to a wind power motor designed primarily for use in driving electrical generators, but it is to be understood that a motor in accordance with this invention may be employed in any connection for which it may be found applicable, and has for its object to provide, in a manner as hereinafter set forth, a motor of the class referred to for operating an electric generator for generating electricity designed primarily for the charging of storage batteries, but it is to be understood that the electrical energy generated may be employed in any connection for which it is found applicable.

A further object of the invention is to provide, in a manner as hereinafter set forth, a wind power motor so arranged relative to the generator as to provide for the elimination of the use of or need of collectors or slip rings and brushes to carry the generated current to the battery as is the case where the generator bodily turns with the wind mill head as a wind shifts.

A further object of the invention is to provide, in a manner as hereinafter set forth, a wind power motor including, preferably, three wind-driven driving elements and further including means for regulating the speed imparted to the apparatus by said elements and with the means for regulating the speed so arranged and set up to be active solely upon the wind-driven driving elements whereby it does not necessitate the turning of the whole assembly out of the wind to regulate the speed of the wind-driven driving elements of the motor.

A further object of the invention is to provide, in a manner as hereinafter set forth, a wind power motor including a series of wind-driven driving elements. The number of such elements is such to produce an unusually smooth running unit, and in this connection the wind-driven driving elements are to be three in number.

Further objects of the invention are to provide, in a manner as hereinafter set forth, a wind power motor of the wind-driven type which is simple in its construction and arrangement, strong, durable, thoroughly efficient in its use, conveniently assembled and comparatively inexpensive to set up.

With the foregoing and other objects in view the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:—

Figure 1 is a front elevation of a wind power motor of the wind driven type in accordance with this invention.

Figure 2 is a fragmentary view in side elevation of the motor.

Figure 3:
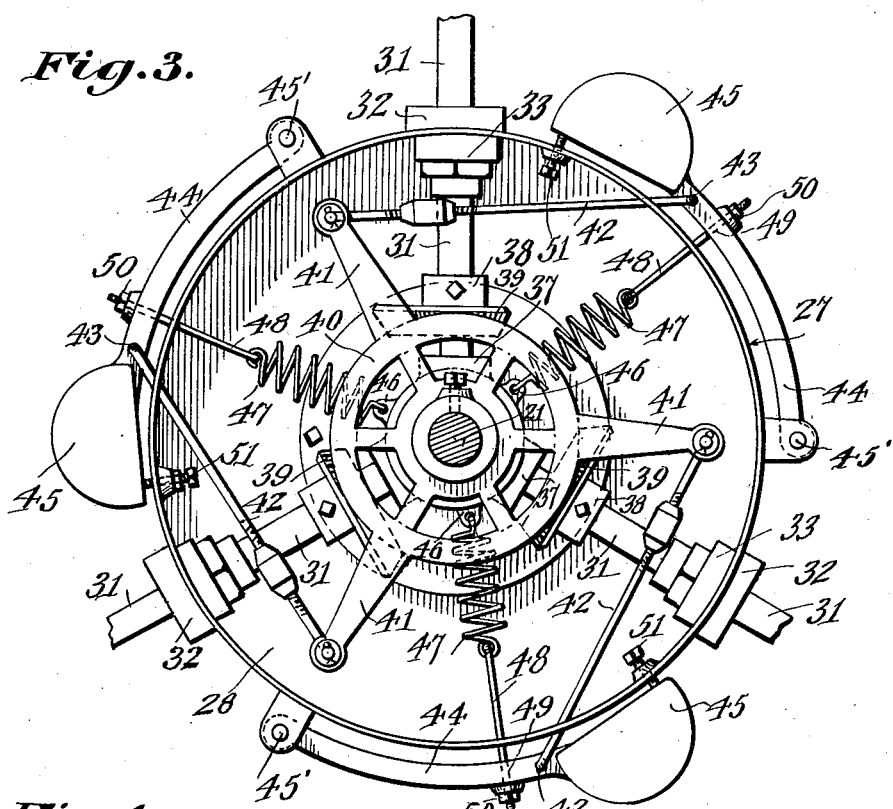
Figure 3 is a section on line 3—3 of Figure 2.
Figure 4:
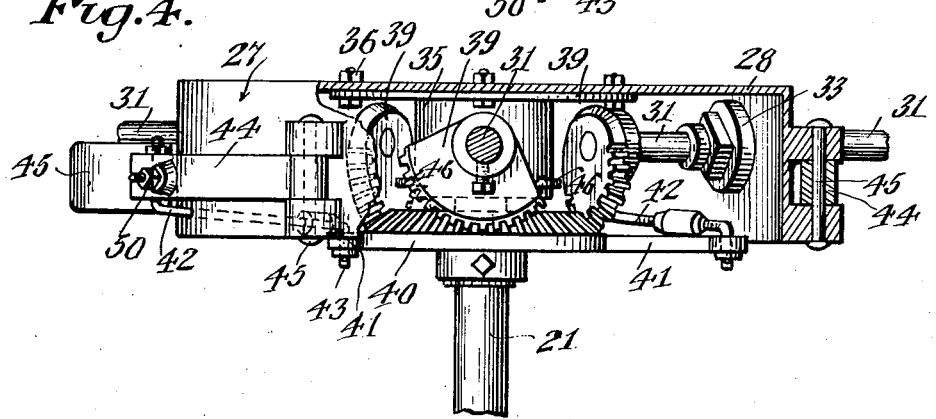
Figure 4 is a fragmentary view in sectional plan of the motor.

A wind power motor in accordance with this invention includes a support in the form of a skeleton tower 1 provided intermediate its ends with a stand or platform 2 and above and in proximity to the latter with a hanger 3 for suspending an electrical generator 4, the shaft of which is indicated at 5 and extends upwardly therefrom. Conducting lines for the generated energy are indicated at 6 and which preferably lead to a storage battery for charging the same, but it is to be understood that the lines 6 can be directed to any desired point to employ the energy provided by the generator on the operation of the latter. The hanger 3 is positioned a substantial distance below the top or head member 7 of the tower 1.

Extending down through the head or top member 7 is a power transmitting shaft 8 for the purpose of driving the generator shaft 5. The shafts 5 and 8 are connected together by a universal joint 9 or by any other suitable coupling means to provide for driving the shaft 5 from the shaft 8. Above the head or top member 7 a braking device 10 is provided for shaft 8 and which is operated by a brake lever 11 pivotally connected as at 12 to a support 13 carried by the head or top member 7. The lever 11 is shifted by means of a pull member 14 which extends to the lower end of the tower 1, so that it can be conveniently grasped by a person for shifting the lever 11 to apply the brake 10 to retard or discontinue the operation of shaft 8.

It is to be understood that any suitable braking means can be employed for use in connection with the apparatus for the purpose of discontinuing the operation of the generator 4, as well as other elements of the apparatus.

The shaft 8 extends a substantial distance above the braking device 10 and into a revoluble carrier 15 preferably constructed of a pair of annular, flanged sections formed with reduced, semi-circular, depending extensions 16 which are integral with the flanges 17 of the carrier. The flanges 17 are secured together by holdfast devices 18. The carrier 15 will revolve about the upper portion of the shaft 8 and the latter at its upper end carries a beveled pinion 19 with which meshes a beveled gear 20 for the purpose of driving shaft 8. An operating shaft for the pinion 20 is indicated at 21 and which extends through the carrier 15 and projects a greater distance from one side thereof than the other. The carrier 15 is a gear housing. The carrier 15 has a laterally disposed, tubular extension 22 into which extends the shaft 21, and the said extension 22 is anchored to a supporting arm 23 for a vane 24, the latter being formed of two sections and one section being arranged above and the other below the arm 23. The sections are connected together by a coupling means as indicated at 25 and said means is also secured to the arm 23. The means for fixedly securing the arm 23 to the extension 22 is indicated at 26.

The shaft 21 is operated by a wind-driven propeller mechanism and with the speed of the latter regulated. The propeller mechanism includes a drum comprising an annular body portion 27 and a head 28 which closes the front of the drum, the rear of the latter being open. The drum revolves, is mounted on the foward end of shaft 21 and secured to the latter fixedly. The revolving of the drum is had through the medium of a series of wind-driven driving elements, and as the shaft 21 is coupled to the drum it is carried therewith, operates in the same direction as that of the drum, provides for the rotation of the gear 20, which in turn will operate pinion 19 and provide for the driving of the shaft 8, resulting in the operation of the generator shaft 5, thereby providing for the generation of electrical energy by the generator 4.

The shaft 21 and drum are bodily movable with the carrier 15 as the shaft 21 is so connected to the carrier that when the latter is revolved the shaft 21 is bodily carried therewith, and which in turn will carry the drum to which shaft 21 is coupled.

Three wind-driven driving elements are employed for the drum, the latter being referred to generally at 29 and each of said elements is in the form of a propeller blade 30 provided with a shaft 31 extending through bearings 32, 33 and also the body portion 27 of drum 29. Positioned against the inner face of the head 28, centrally thereof is a tubular member 34, formed with an annular flange 35 through which extend holdfast devices 36 to fixedly secure member 34 to the head 28 and within the drum. The member 34 projects towards the rear of the drum and is formed with radially disposed, peripheral sockets 37 in which the inner ends of the shafts 31 are journaled. The shafts 31 are arranged equi-distant apart. Each shaft 31 has fixedly secured thereto, at a point in proximity to its inner end the hub 38 of a beveled segmental-shaped gear 39. Freely mounted upon hub of drum assembly 29 is a beveled, crown gear 40 which is common to and meshes with the teeth of the beveled segmental gears 39. The shaft 21 is keyed in the hub of drum 29. The gear 40 is formed with a series of radially extending arms 41 corresponding in number to the number of the shafts 31, and to the outer end of each arm is pivoted a lengthwise adjustable coupling rod 42 which extends through the body portion of the drum 29 and is connected, as at 43, to a spring controlled pivoted arm 44. One end of the arm 44 is pivoted as at 45 with the body portion 27 of the drum 29 and the other end of the arm 44 carries a weight 45. The tubular member 34 has its periphery provided between the sockets 37 with radially disposed, apertured ears 46 to each of which is anchored the inner end of a controlling spring 47.

Attached to the outer end of each spring 47 is a coupling bar 48 which extends through the body portion 27 of the drum 29 and also extends through an arm 44, as at 49 and carries on its outer end means, as at 50 for adjustably connecting it to the arm 44.

The pivoted arms 44, carrying the weights 45, in connection with the springs 47, rods 42 and arms 41 provide a governor mechanism or speed regulating device for the wind-driven driving elements. Adjustable stop members 51 are carried by the body portion and are adapted to be engaged by the weights 45. The members 51 enable the adjustment of the limit of the return movement of the weights 45 in a direction towards the body portion 27 of the drum.

The governor mechanism when extended, shifts the gear 40 and gear 40 acting upon the gears 39 will partly rotate the shafts 31 causing the blades to turn more edgewise into the wind.

The blades 30 are shaped for comparatively high speed, and when at rest or running in a light breeze, their flat surfaces, more especially the blade tips, are in a decidedly flat or right angular position in relation to the wind. When the speed of the drum reaches a predetermined figure, approximately 275 revolutions per minute, the governor weights are forced outwardly, due to the centrifugal action, to provide for the shift of the gear 40 and causing the blades to turn more edgewise into the wind. This action regulates the speed.

The advantage of setting up the propeller mechanism with three blades is that it has been found that the three blade propeller has proved to generate considerably more power in any given wind velocity than a larger number of blades, figuring each the same size in diameter. This is due to the fact that there is less air friction or drag when running than in the case of the wheel type with their many blades and braces, then further due to the comparatively greater speed of the propeller type of blades all of the available energy of the moving air within the blade limits is utilized.

Further by setting up the propeller mechanism with three blades more starting torque is produced and a much better balanced and smoother running unit results, than in the two blade propeller type which advantage is most noticeable in variable winds which cause the assembly to rotate back and forth, in which case a very noticeable vibration or quiver is eliminated by use of third blade.

The mounting of the generator stationary in the manner as shown, that is directly on the support or tower, has several distinctive advantages over the other types of wind-driven generating plants in which the generator is mounted on the top with the mill head proper, as in such case collector rings and brushes must be used to transmit the generated current to the battery. With the type of mounting in accordance with this invention, it is not necessary to employ collector rings and brushes as the conducting wires for the generated energy may be directly fastened to the generator. Further, the mounting of the generator in the manner as shown makes it more accessible.

It is thought the many advantages of a wind power motor, of the wind-driven type and in accordance with this invention can be readily understood, and although the preferred embodiment of the invention is as illustrated and described, yet it is to be understood that changes in the details of construction can be had which fall within the scope of the invention as claimed.

What I claim is:

1. A wind driven motor mechanism comprising a power transmitting means for the object to be driven, a drum provided with a rearwardly extending hub fixed to one end of said means, a set of radially disposed, angularly adjustable wind driven elements for rotating the drum thereby driving said power transmitting means, each of said elements journaled at its inner end in said hub, intermediate its ends in the body of the drum, projecting from the latter and carrying a blade at its outer end, a bevel gear revolubly mounted on said hub and formed with radially disposed arms, a set of spaced, speed controlling governor arms disposed circumferentially of and carried by the body of the drum, each of said governor arms pivoted at one end to the drum body and carrying a weight at its other end, said governor arms shiftable outwardly on their pivots from said drum body by centrifugal force on the rotation of the drum above a predetermined speed, adjustable connections between the governor arms and the radial arms for revolving the bevel gear in one direction on the outward shift of the governor arms, spring controlled connections between said hub and governor arms to provide for the inward shift of the governor arms to revolve the bevel gear in the other direction, and quadrant shaped gears carried by said element, meshing with and coacting with said bevel gear to provide for the angularly adjusting of said blades on the revolving in either direction of the bevel gear.

2. A wind driven motor mechanism comprising a power transmitting means for the object to be driven, a drum provided with a rearwardly extending hub fixed to one end of said means, a set of radially disposed, angularly adjustable wind driven elements for rotating the drum thereby driving said power transmitting means, each of said elements journaled at its inner end in said hub, intermediate its ends in the body of the drum, projecting from the latter and carrying a blade at its outer end, a level gear revolubly mounted on said hub and formed with radially disposed arms, a set of spaced, speed controlling governor arms disposed circumferentially of and carried by the body of the drum, each of said governor arms pivoted at one end to the drum body and carrying a weight at its other end, said governor arms shiftable outwardly on their pivots from said drum body by centrifugal force on the rotation of the drum above the predetermined speed, adjustable connections between the governor arms and the radial arms for revolving the bevel gear in one direction on the outward shift of the governor arms, spring controlled connections between said hub and governor arms to provide for the inward shift of the governor arms to revolve the bevel gear in the other direction, quadrant shaped gears carried by said element meshing with and coacting with said bevel gear to provide for the angularly adjusting of said blades on the revolving in either direction of the bevel gear, and a universal joint connection at the other end of said power transmitting means for connecting the latter to the object to be driven from the motor mechanism.

3. A wind driven motor mechanism comprising a power transmitting means for the object to be driven, a drum provided with a rearwardly extending hub fixed to one end of said means, a set of radially disposed, angularly adjustable wind driven elements for rotating the drum thereby driving said power transmitting means, each of said elements journaled at its inner end in said hub, intermediate its ends in the body of the drum, projecting from the latter and carrying a blade at its outer end, a bevel gear revolubly mounted on said hub and formed with radially disposed arms, a set of spaced, speed controlling governor arms disposed circumferentially of and carried by the body of the drum, each of said governor arms pivoted at one end to the drum body and carrying a weight at its other end, said governor arms shiftable outwardly on their pivots from said drum body by centrifugal force on the rotation of the drum above a predetermined speed, adjustable connections between the governor arms and the radial arms for revolving the bevel gear in one direction on the outward shift of the governor arms, spring controlled connections between said hub and governor arms to provide for the inward shift of the governor arms to revolve the bevel gear in the other direction, quadrant shaped gears carried by said element, meshing with and coacting with said bevel gear to provide for the angularly adjusting of said blades on the revolving in either direction of the bevel gear, and adjustable stops carried by the body of the drum and coacting with the weights for the governor arms for arresting the inward shift of the governor arms.

4. A wind driven motor mechanism comprising a power transmitting means for the object to be driven, a drum provided with a rearwardly extending hub fixed to one end of said means, a set of radially disposed, angularly adjustable wind driven elements for rotating the drum thereby driving said power transmitting means, each of said elements journaled at its inner end in said hub, intermediate its ends in the body of the drum, projecting from the latter and carrying a blade at its outer end, a bevel gear revolubly mounted on said hub and formed with radially disposed arms, a set of spaced, speed controlling governor arms disposed circumferentially of and carried by the body of the drum, each of said governor arms pivoted at one end to the drum body and carrying a weight at its other end, said governor arms shiftable outwardly on their pivots from said drum body by centrifugal force on the rotation of the drum above a predetermined speed, adjustable connections between the governor arms and the radial arms for revolving the bevel gear in one direction on the outward shift of the governor arms, spring controlled connections between said hub and governor arms to provide for the inward shift of the governor arms to revolve the bevel gear in the other direction, quadrant shaped gears carried by said element, meshing with and coacting with said bevel gear to provide for the angularly adjusting of said blades on the revolving in either direction of the bevel gear, a universal joint connection at the other end of said power transmitting means for connecting the latter to the object to be driven from the motor mechanism, and adjustable stops carried by the body of the drum and coacting with the weights for the governor arms for arresting the inward shift of the governor arms.

5. A wind driven motor mechanism comprising a vertically disposed power transmitting shaft provided at one end with a universal joint for connecting it to the object to be driven, said shaft having a gear at its other end, a horizontally disposed operating shaft having a gear at its inner end meshing with the gear on the power transmitting shaft for operating the latter, a drum provided with a rearwardly extending hub fixed to the other end of said operating shaft, a set of radially disposed, angularly adjustable wind driven elements for rotating the drum thereby driving said operating shaft, each of said elements including a shaft journaled at its inner end in said hub, intermediate its ends in the body of the drum, projecting from the latter and carrying a blade at its outer end, a bevel gear revolubly mounted on said hub and formed with radially disposed arms, a set of spaced, speed controlling governor arms disposed circumferentially of and carried by the body of the drum, each of said governor arms pivoted at one end to the drum body and carrying a weight at its other end, said governor arms shiftable outwardly on their pivots from said drum body by centrifugal force on the rotation of the drum above a predetermined speed, and adjustable connection between each radial arm and a governor arm to provide for the revolving of the bevel gear in one direction on the outward shift of the governor arm, a spring controlled connection between said hub and each governor arm to provide for the inward shift of the governor arm to revolve the bevel gear in an opposite direction, and a quadrant shaped gear carried by the shaft of each of said elements and meshing with and coacting with said bevel gear to provide for the angularly adjusting of said blade on the revolving in either direction of the bevel gear.

6. A wind driven motor mechanism comprising a vertically disposed power transmitting shaft provided at one end with a universal joint for connecting it to the object to be driven, said shaft having a gear at its other end, a horizontally disposed operating shaft having a gear at its inner end meshing with the gear on the power transmitting shaft for operating the latter, a drum provided with a rearwardly extending hub fixed to the other end of said operating shaft, a set of radially disposed, angularly adjustable wind driven elements for rotating the drum thereby driving said operating shaft, each of said elements including a shaft journaled at its inner end in said hub, intermediate its ends in the body of the drum, projecting from the latter and carrying a blade at its outer end, a bevel gear revolubly mounted on said hub and formed with radially disposed arms, a set of spaced, speed controlling governor arms disposed circumferentially of and carried by the body of the drum, each of said governor arms pivoted at one end to the drum body and carrying a weight at its other end, said governor arms shiftable outwardly on their pivots from said drum body by centrifugal force on the rotation of the drum above a predetermined speed, an adjustable connection between each radial arm and a governor arm to provide for the revolving of the bevel gear in one direction on the outward shift of the governor arm, a spring controlled connection between said hub and each governor arm to provide for the inward shift of the governor arm to revolve the bevel gear in an opposite direction, a quadrant shaped gear carried by the shaft of each of said elements and meshing with and coacting with said bevel gear to provide for the angularly adjusting of said blade on the revolving in either direction of the bevel gear, adjustable stops carried by the body of the drum and coacting with the weights of the governor arms for arresting the inward shift of the governor arms, revoluble supporting means for said operating shaft, said revoluble supporting means revolving about said vertical shaft, and braking means for said vertical shaft.

7. A wind driven motor mechanism comprising a vertically disposed power transmitting shaft provided at one end with a universal joint for connecting it to the object to be driven, said shaft having a gear at its other end, a horizontally disposed operating shaft having a gear at its inner end meshing with the gear on the power transmitting shaft for operating the latter, a drum provided with a rearwardly extending hub fixed to the other end of said operating shaft, a set of radially disposed, angularly adjustable wind driven elements for rotating the drum thereby driving said operating shaft, each of said elements including a shaft journaled at its inner end in said hub, intermediate its ends in the body of the drum, projecting from the latter and carrying a blade at its outer end, a bevel gear revolubly mounted on said hub and formed with radially disposed arms, a set of spaced, speed controlling governor arms disposed circumferentially of and carried by the body of the drum, each of said governor arms pivoted at one end to the drum body and carrying a weight at its other end, said governor arms shiftable outwardly on their pivots from said drum body by centrifugal force on the rotation of the drum above a predetermined speed, an adjustable connection between each radial arm and a governor arm to provide for the revolving of the bevel gear in one direction on the outward shift of the governor arm, a spring controlled connection between said hub and each governor arm to provide for the inward shift of the governor arm to revolve the bevel gear in an opposite direction, a quadrant shaped gear carried by the shaft of each of said elements and meshing with and coacting with said bevel gear to provide for the angularly adjusting of said blade on the revolving in either direction of the bevel gear, and adjustable stops carried by the body of the drum and coacting with the weights of the governor arms for arresting the inward shift of the governor arms.

In testimony whereof, I affix my signature hereto.

JOSEPH H. JACOBS.